United States Patent [19]

Brockett

[11] Patent Number: 4,788,788
[45] Date of Patent: Dec. 6, 1988

[54] CATFISH BAIT HOLDER

[76] Inventor: Nickie W. Brockett, 417 Summer St., Burlington, Iowa 52601

[21] Appl. No.: 176,236

[22] Filed: Mar. 31, 1988

[51] Int. Cl.$^4$ .............................................. A01K 97/02
[52] U.S. Cl. ..................................... 43/44.99; 43/44.2
[58] Field of Search ..................... 43/44.99, 41, 44.2, 43/44.4, 44.8, 44.82

[56] References Cited

U.S. PATENT DOCUMENTS

| | | | |
|---|---|---|---|
| 339,952 | 4/1886 | Wakeman | 43/44.4 |
| 856,867 | 6/1907 | Hayward | 43/41 |
| 1,452,377 | 4/1923 | Hanselman | 43/44.4 |
| 2,102,739 | 12/1937 | Peters | 43/41 |
| 2,402,730 | 6/1946 | Bucks | 43/44.4 |
| 2,634,540 | 4/1953 | Nelson et al. | 43/44.4 |
| 2,780,021 | 2/1957 | Fagg | 43/41 |
| 2,972,831 | 2/1961 | Anselmi | 43/44.4 |
| 3,047,975 | 8/1962 | Pretorius | 43/42.24 |
| 4,603,502 | 8/1986 | MacDonald | 43/44.99 |

FOREIGN PATENT DOCUMENTS

| | | | |
|---|---|---|---|
| 1464926 | 11/1966 | France | 43/43.6 |
| 86/06251 | 11/1986 | World Int. Prop. O. | 43/44.99 |

*Primary Examiner*—Gene P. Crosby
*Attorney, Agent, or Firm*—Jerry T. Kearns

[57] ABSTRACT

A catfish bait holder utilizes a conventional treble hook having an elongated shank secured to a leader. A cylindrical sponge having a central axial hole is positioned around the shank of the hook. An elongated hollow cylinder formed from an open mesh net material surrounds the cylindrical sponge and is in co-axial alignment therewith. The internal diameter of the hollow mesh cylinder and the external diameter of the cylindrical sponge are substantially equal so that the mesh cylinder is retained in position by frictional engagement with the sponge. In use, the mesh cylinder is filled with a viscous bait paste, which oozes out of the mesh cylinder and provides a chumming effect. In a second embodiment of the invention, the mesh cylinder is provided with an enclosed conical tapered top portion and the cylindrical sponge is provided with a plurality of circumferentially spaced radially extending projections for engagement with the open mesh cylinder. These projections serve to retain the mesh cylinder in position around the sponge.

19 Claims, 4 Drawing Sheets

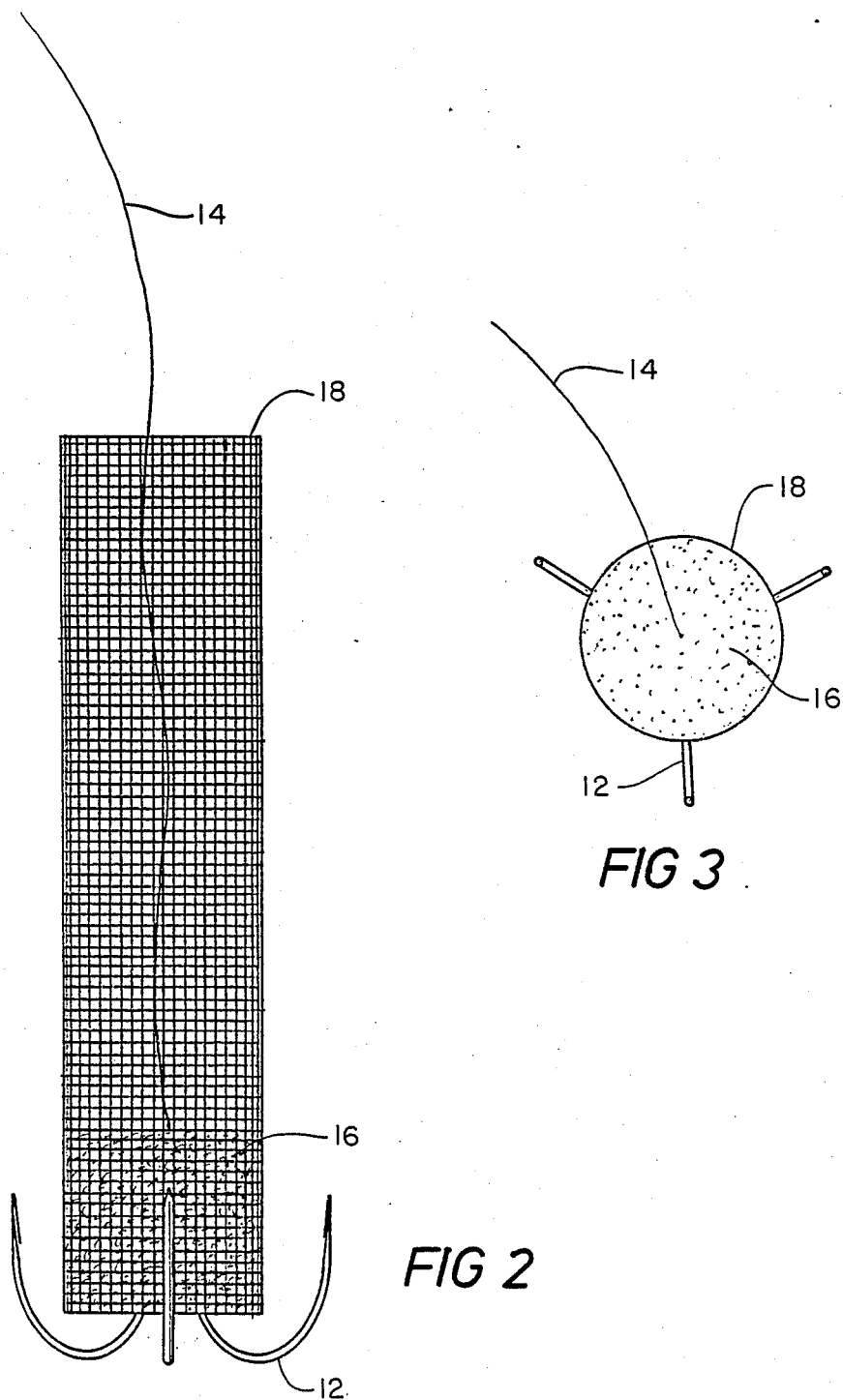

CATFISH BAIT HOLDER

BACKGROUND OF THE INVENTION

1. Field of the Invention

The present invention relates to bait holders, and more particularly pertains to a new and improved catfish bait holder. Various forms of bait are available for use in fishing for catfish. For example, worms, artificial lures and various forms of live baits are utilized. All these forms of baits suffer either from a lack of effectiveness or from inconvenient and messy bait application. Additionally, these known forms of bait are very susceptible to loss while casting. In order to overcome these disadvantages, the present invention provides a new and improved bait holder which enable a paste type bait to be conveniently utilized.

2. Description of the Prior Art

Various types of bait holders are known in the prior art. A typical example of such a bait holder is to be found in U.S. Pat. No. 339,952, which issued to A. Wakeman on Apr. 13, 1886. This patent discloses a spinning type lure provided with a wire cage for encircling a minnow. U.S. Pat. No. 1,452,377, which issued to A. Hanselman on Apr. 17, 1923, discloses a hook having an elongated shank provided with a pair of spaced rings adapted for use in encircling a live frog for use as bait. U.S. Pat. No. 2,402,730, which issued to D. Bucks on June 25, 1946, discloses a fish hook provided with a pair of dual opposed hooks connected to a single elongated shank. A pair of ring shaped bait encircling clamps are provided between the opposed hooks and are adapted for securing a live minnow. U.S. Pat. No. 2,634,540, which issued to G. Nelson et al on Apr. 14, 1953, discloses a fishing lure which provides a cage for retaining bread or other bait material above a fish hook. The bait holding cage is provided with inwardly extending projections for engagement with an annular recess of a fishing bobber. U.S. Pat. No. 2,972,831, which issued to J. Anselmi on Feb. 28, 1961, discloses a fishing lure provided with an elongated hollow cylindrical open mesh bait harness adapted to retain a live eel for use as bait.

While the above mentioned devices are suited for their intended usage, none of these devices provide a bait holder which utilizes a cylindrical sponge in conjunction with a hollow open net mesh cylinder for retaining a paste type bait. Inasmuch as the art is relatively crowded with respect to these various types of bait holders, it can be appreciated that there is a continuing need for and interest in improvements to such bait holders, and in this respect, the present invention addresses this need and interest.

SUMMARY OF THE INVENTION

In view of the foregoing disadvantages inherent in the known types of bait holders now present in the prior art, the present invention provides an improved catfish bait holder. As such, the general purpose of the present invention, which will be described subsequently in greater detail, is to provide a new and improved catfish bait holder which has all the advantages of the prior art bait holders and none of the disadvantages.

To attain this, representative embodiments of the concepts of the present invention are illustrated in the drawings and make use of a conventional treble hook having an elongated shank secured to a leader. A cylindrical sponge having a central axial hole is positioned around the shank of the hook. An elongated hollow cylinder formed from an open mesh net material surrounds the cylindrical sponge and is in co-axial alignment therewith. The internal diameter of the hollow mesh cylinder and the external diameter of the cylindrical sponge are substantially equal so that the mesh cylinder is retained in position by frictional engagement with the sponge. In use, the mesh cylinder is filled with a viscous bait paste, which oozes out of the mesh cylinder and provides a chumming effect. In a second embodiment of the invention, the mesh cylinder is provided with an enclosed conical tapered top portion and the cylindrical sponge is provided with a plurality of circumferentially spaced radially extending projections for engagement with the open mesh cylinder. These projections serve to retain the mesh cylinder in position around the sponge.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved catfish bait holder which has all the advantages of the prior art bait holders and none of the disadvantages.

It is another object of the present invention to provide a new and improved catfish bait holder which may be easily and efficiently manufactured and marketed.

It is a further object of the present invention to provide a new and improved catfish bait holder which is of a durable and reliable construction.

An even further object of the present invention is to provide a new and improved catfish bait holder which is susceptible of a low cost of manufacture with regard to both materials and labor, and which accordingly is then susceptible of low prices of sale to the consuming public, thereby making such bait holders economically available to the buying public.

Still yet another object of the present invention is to provide a new and improved catfish bait holder which provides in the apparatuses and methods of the prior art some of the advantages thereof, while simultaneously overcoming some of the disadvantages normally associated therewith.

Still another object of the present invention is to provide a new and improved catfish bait holder which utilizes a cylindrical sponge in conjunction with a coaxially positioned open net mesh cylinder for retaining a paste type bait adjacent to a treble hook.

Yet another object of the present invention is to provide a new and improved catfish bait holder which utilizes an open mesh hollow cylinder in conjunction with a paste type bait to provide a chumming effect.

Even still another object of the present invention is to provide a new and improved catfish bait holder adapted to securely retain a paste type bait during casting of a baited treble hook.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the bait holder according to the first embodiment of the present invention.

FIG. 3 is a top view of the bait holder according to the first embodiment of the present invention.

DESCRIPTION OF THE PREFERRED EMBODIMENT

Figure 1:
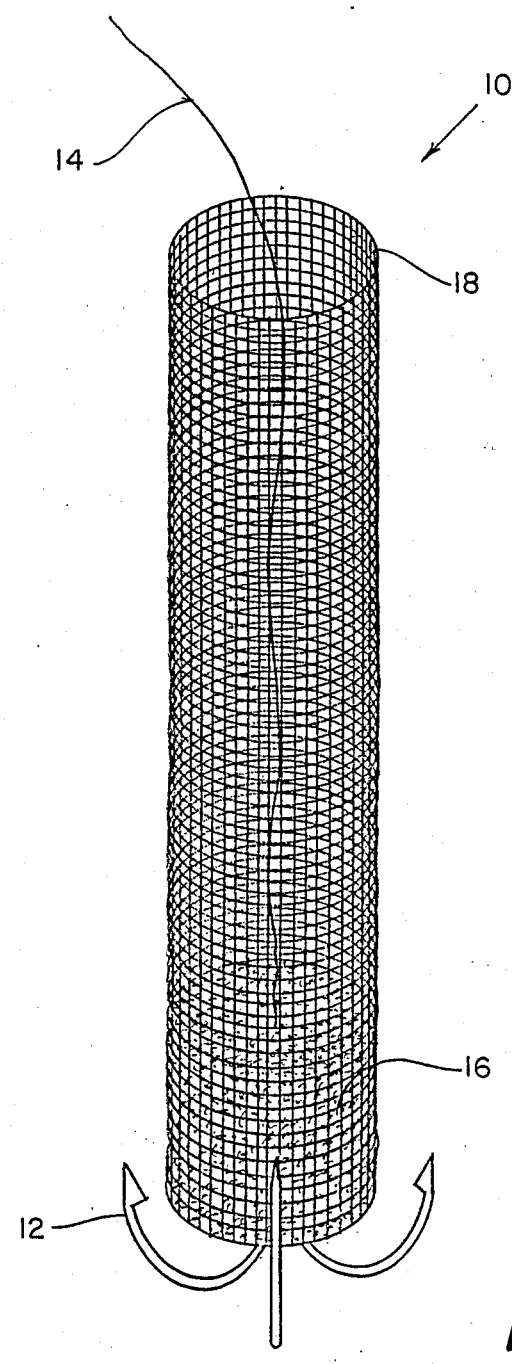
FIG. 1 is a perspective view of a catfish bait holder according to a first embodiment of the present invention.

With reference now to the drawings, and in particular to FIG. 1 thereof, a new and improved catfish bait holder embodying the principles and concepts of the present invention and generally designated by the reference numeral 10 will be described.

More specifically, it will be noted that the first embodiment 10 of the invention includes a conventional treble hook 12 having an elongated shank to which a leader 14 is secured. A cylindrical sponge 16 has a central axial hole through which the shank of the hook 12 is inserted. The leader 14 is threaded through this axial hole in the sponge 16. An open hollow cylinder 18, formed from an open net mesh material, surrounds the cylindrical sponge 16 and a lower portion of the leader 14. The cylinder 18 is in coaxial relation with the sponge 16 and has an internal diameter substantially equal to the external diameter of the cylindrical sponge 16. These dimensions, in conjunction with the compressible nature of the sponge 16, ensure that the cylinder 18 will be frictionally retained in position around the sponge 16. The cylinder 18 has a preferred length of about three inches and an internal diameter between five sixteenths and eleven thirty seconds of an inch. The cylindrical sponge 16 has a corresponding external diameter and a length selected in the range of five sixteenths to one half of an inch. The relative dimensions of the cylindrical sponge 16 and hollow cylinder 18 are selected depending upon the size of the treble hook 12. For example, with a number ten treble hook, the cylinder 18 will have a diameter of about five sixteenths of an inch and the sponge 16 will have a diameter of about five sixteenths of an inch and a length of also about five sixteenths of an inch. When utilizing a number eight treble hook, the cylinder 18 will have a diameter of about three eighths of an inch and the sponge 16 will have a diameter of about three eighths of an inch and a length of also about three eighths of an inch. When utilizing a number six treble hook, the cylinder 18 and sponge 16 will each have a diameter of about seven sixteenths of an inch and the sponge 16 will have a length of also about seven sixteenths of an inch. When utilizing a number four treble hook, the tubular cylinder 18 and cylindrical sponge 16 will each have a diameter of about one half inch and the sponge 16 will have a height of also about one half inch. In each case, a twenty pound nine inch length leader 14 will preferably be utilized. The cylinder 18 is formed from an open mesh net material having a one sixteenth inch square grid pattern. This material preferably has a three sixty fourths of an inch square internal grid dimension. The wall thickness of the cylinder 18 is about 1/128 of an inch. The cylinder 18 may be formed from a natural or synthetic fabric material.

With reference now to FIG. 2, the method of baiting a hook according to the present invention will now be described. A conventional treble hook 12 with an attached leader 14 is inserted into a central axial hole in the cylindrical sponge 16. The hollow tubular open mesh cylinder 18 is then inserted in coaxial alignment around the sponge 16 and also around a lower portion of the leader 14. By virtue of the previously described frictional engagement between the cylinder 18 and the sponge 16, these elements will be maintained in a relatively secure alignment. A nozzle of a paste type bait tube is then inserted into the interior of the cylinder 18 and bait is dispensed until the cylinder 18 is filled to a desired level. Due to the viscous nature of the bait and the relatively small spacing of the square grids of the open mesh cylinder 18, the bait will be retained, while still allowing the bait to slowly ooze out through the cylindrical side wall of the cylinder 18. This provides a chumming effect when the hook 12 is cast into a body of water. Due to this chumming effect, the bait holder of the present invention has been found to be more effective than conventional worm type bait holders as well as artificial lures and various types of live bait holders. Additionally, the bait holder 10 of the first embodiment of the present invention may be easily rebaited without touching any messy baits.

In FIG. 3, a top view of the bait holder 10 according to the first embodiment of the present invention is provided. As illustrated, the cylindrical sponge 16 is retained in co-axial alignment within the tubular open mesh cylinder 18 and serves as a stopper to close the bottom end thereof. The three prongs of the treble hook 12 project radially outwardly beyond the side wall of the cylinder 18, and thus no interference is present to prevent a fish from being hooked.

Figures 4, 5:
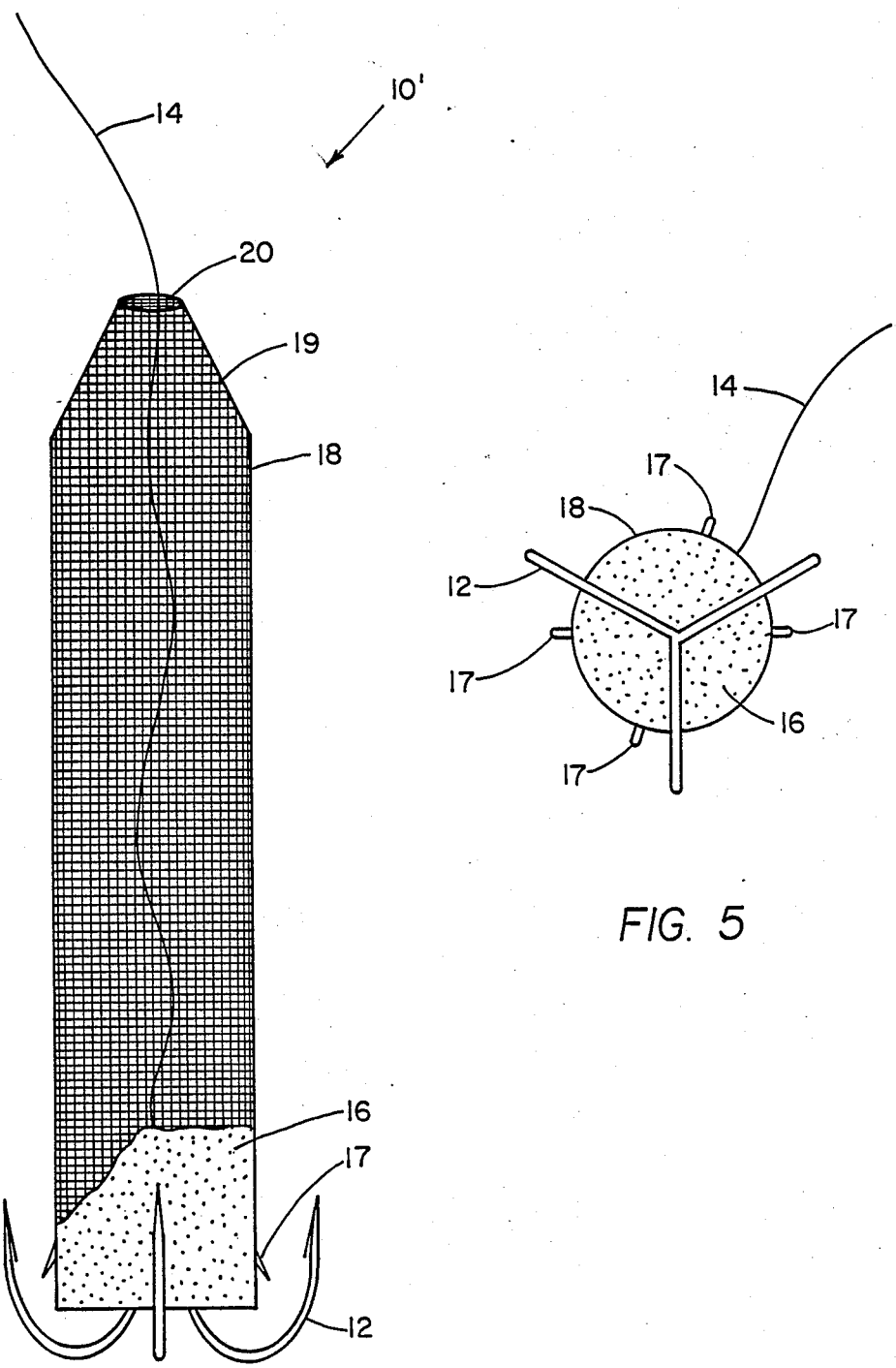
FIG. 4 is a side view, partially cut away, illustrating a bait holder according to the second embodiment of the present invention.
FIG. 5 is a bottom view of the bait holder according to the second embodiment of the present invention.

With reference now to FIG. 4, a second embodiment 10' of a bait holder according to the present invention will now be described. The second embodiment 10' is substantially similar to the first embodiment 10, and like reference numerals have been utilized to designate similar parts. The second embodiment 10' has an enclosed conically tapered top portion 19 formed integrally with the hollow cylinder 18. A centrally disposed grommet 20 is provided at a top portion of the conical taper 19 for the reception of the leader 14. Radially outwardly extending projections 17 are formed on the sponge 16 and serve to engage the open mesh grid cylinder 18. These projections 17 provide an enhanced attachment, and may be formed in a variety of ways. For example, the projections 17 may be formed integrally with the sponge 17 from the same sponge material. Alternatively, the projections 17 may be formed as semi-rigid plastic elements which are inserted through the sponge 16. The projections 17 may each be formed as separate elements, or opposed projections may be formed on opposite ends of a single elongated bar which passes diametrically through the sponge 16.

As shown in FIG. 5, a plurality of projections 17 are arranged in diametrically opposed pairs and are spaced around the circumference of the sponge 16. In use, the cylinder 18 may be detached from the projection 17 by slightly compressing the sponge 16 by pinching between a thumb and forefinger. The semirigid nature of the material utilized in forming the projections 17 provides an enhanced securement of the cylinder 18, while at the same time allowing the projections to be radially compressed, allowing the cylinder 18 to be conveniently detached, when desired. The second embodiment 10' of a bait holder according to the present invention may be rebaited either by removing the cylinder 18 from the sponge 16, or by inserting the nozzle of a bait paste tube through the grommet 20.

Figures 6, 7:
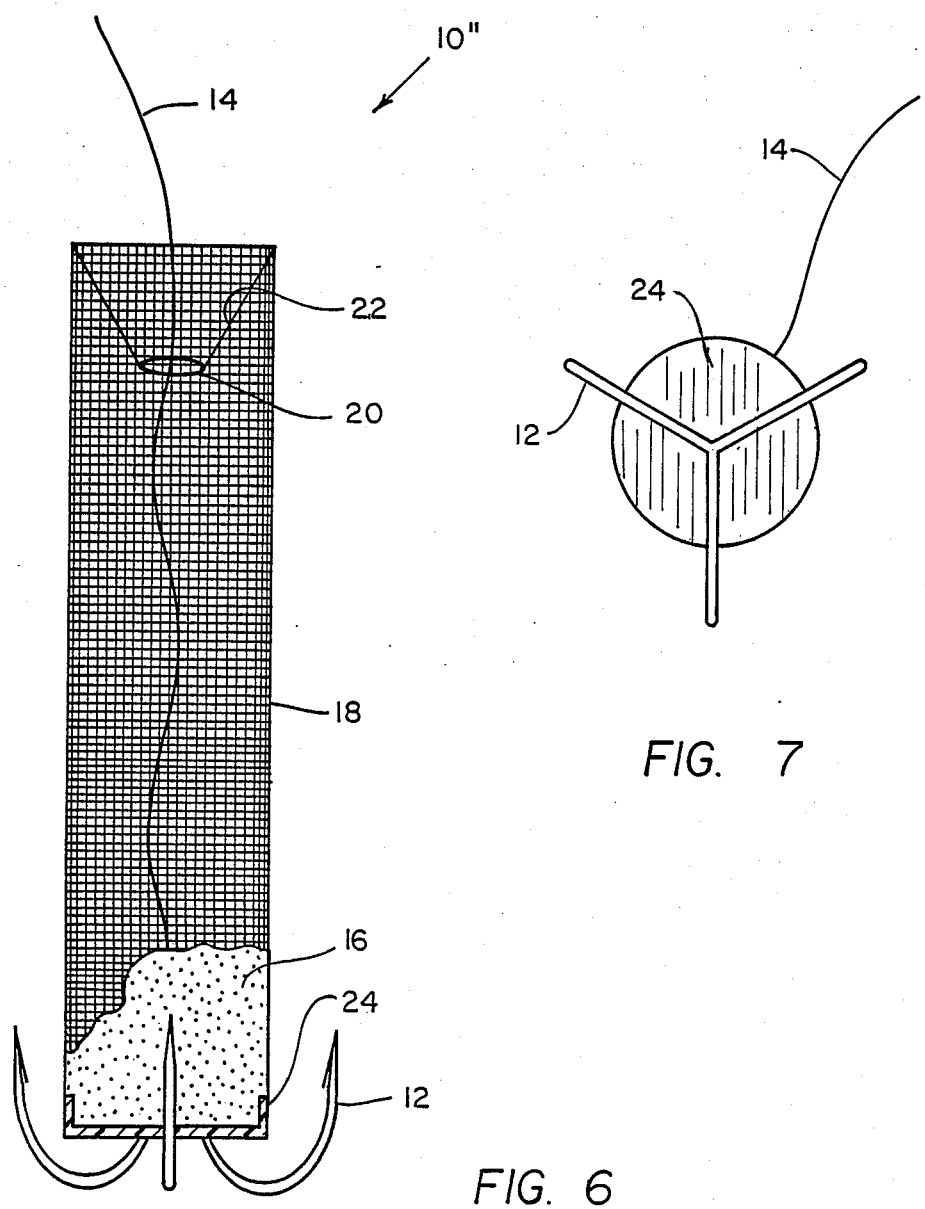
FIG. 6 is a side view, partially cut away, of the bait holder according to the third embodiment of the present invention.
FIG. 7 is a bottom view of the bait holder according to the third embodiment of the present invention.

In FIG. 6, a third embodiment 10", of the present invention is illustrated. The construction of the bait holder 10" is substantially similar to that of the first 10 and second 10' embodiments previously described, with the exceptions that the conical portion 22 is inverted inwardly, and a bottom cap 24 formed from a rigid plastic material is provided. The bottom cap is secured adhesively or by other conventional means to the bottom portion of the mesh cylinder 18, and to the sponge 16. The cylindrical sidewall of the cap 24 has an axial extent sufficient to prevent the barb of the hook 12 from engaging the mesh cylinder 18.

As may now be readily understood, the bait holder according to the present invention has several advantages over the conventional form of bait holders. Less bait is lost upon casting, less bait is lost upon entering the water and rebaiting is more convenient and less messy. Additionally, the bait holder according to the present invention provides a chumming action which enhances effectiveness. It should be noted that the bait holder of the present invention may also be utilized with a dip type bait due to the clinging action of the bait within the small squares of the open mesh net cylinder 18.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved catfish bait holder, comprising:
   hook means having elongated shank means;
   leader means secured to said shank means;
   sponge means surrounding said shank means; and
   mesh net means enclosing said sponge means and a lower portion of said leader means.

2. The catfish bait holder of claim 1, wherein said sponge means comprises a cylindrical sponge and said mesh net means comprises a hollow tubular cylinder.

3. The catfish bait holder of claim 2, wherein said hollow cylinder surrounds said sponge in coaxial alignment therewith.

4. The catfish bait holder of claim 3, wherein said hollow cylinder has an inner diameter substantially equal to an external diameter of said cylindrical sponge and is in frictional engagement therewith.

5. The catfish bait holder of claim 4, wherein said sponge and said cylinder have a diameter of between five sixteenths of an inch and one half inch.

6. The catfish bait holder of claim 5, wherein said sponge has a height less than a height of said hollow cylinder.

7. The catfish bait holder of claim 6, wherein said sponge has a height between five sixteenths of an inch and one half inch and said hollow cylinder has a height of about three inches.

8. The catfish bait holder of claim 7, wherein said hollow cylinder has a square grid pattern with an internal width of each square being about three sixty fourths of an inch.

9. The catfish bait holder of claim 4, further comprising a conical taper portion formed from an open mesh net material attached to a top portion of said hollow cylinder.

10. The catfish bait holder of claim 9, further comprising a plurality of resilient radial projections circumferentially spaced around said sponge.

11. A new and improved fishing bait holder, comprising:
   a treble hook having an elongated shank;

a leader secured to said shank;

a cylindrical sponge surrounding said shank;

an elongated hollow cylinder formed from an open mesh net material enclosing said sponge and a lower portion of said leader;

said cylinder being coaxial with said sponge; and an inner diameter of said cylinder and an external diameter of said cylindrical sponge being substantially equal, whereby said cylinder is frictionally retained around said sponge.

12. The catfish bait holder of claim 11, wherein said sponge and said cylinder each have a diameter between five sixteenths and one half of an inch.

13. The catfish bait holder of claim 11, wherein said sponge has a height of between five sixteenths and one half of an inch and said cylinder has a height of about three inches.

14. The catfish bait holder of claim 11, wherein said open mesh net material has a grid of squares each having an interior width of about three sixty fourths of an inch.

15. The catfish bait holder of 11, further comprising a conical taper portion formed from an open mesh net material attached to a top portion of said hollow cylinder.

16. The catfish bait holder of clain 15, further comprising a plurality of resilient radial projections circumferentially spaced around said sponge.

17. The catfish bait holder of claim 11, further comprising an end cap on said hollow cylinder having a cylindrical sidewall which prevents barbs of said hook from contacting said open mesh net material.

18. The catfish bait holder of claim 11, further comprising an inverted inwardly directed conical taper portion formed from an open mesh net material attached to a top portion of said hollow cylinder.

19. A method of baiting a fishing lure, comprising the steps of:

providing a treble hook having an elongated shank;

providing an elongated leader;

securing said elongated leader to said shank;

providing a cylindrical sponge having a central axial hole;

inserting said leader in said shank through said central hole in said sponge;

providing an elongated hollow cylinder formed from an open net material having an internal diameter substantially equal to the an external diameter of said sponge;

positioning said cylinder co-axially around said sponge and a lower portion of said leader, in frictional engagement with said sponge; and filling said cylinder with a viscous bait paste.

* * * * *